United States Patent
Jiang et al.

(10) Patent No.: US 7,983,179 B2
(45) Date of Patent: Jul. 19, 2011

(54) NETWORK MONITORING BY CUSTOMER PREMISES EQUIPMENT

(75) Inventors: Baofeng Jiang, Pleasanton, CA (US);
Donggen Zhang, Fremont, CA (US);
Kaiyan Chen, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 723 days.

(21) Appl. No.: 11/829,691

(22) Filed: Jul. 27, 2007

(65) Prior Publication Data
US 2009/0028170 A1    Jan. 29, 2009

(51) Int. Cl.
*H04L 1/00* (2006.01)

(52) U.S. Cl. ........ 370/250; 370/252; 370/352; 370/401; 379/142.01

(58) Field of Classification Search .................. 370/241, 370/250; 379/142.04
See application file for complete search history.

(56) References Cited

U.S. PATENT DOCUMENTS

| | | | |
|---|---|---|---|
| 6,829,330 B2 | 12/2004 | Belge et al. | |
| 6,886,180 B1 | 4/2005 | Sandberg et al. | |
| 7,099,439 B2 | 8/2006 | Luneau | |
| 2002/0077711 A1* | 6/2002 | Nixon et al. | 700/51 |
| 2002/0101857 A1* | 8/2002 | Heller | 370/352 |
| 2004/0202237 A1* | 10/2004 | Krinsky et al. | 375/222 |
| 2004/0236860 A1* | 11/2004 | Logston et al. | 709/230 |
| 2005/0007249 A1* | 1/2005 | Eryurek et al. | 340/511 |
| 2006/0203810 A1* | 9/2006 | Owens et al. | 370/355 |
| 2007/0061460 A1* | 3/2007 | Khan et al. | 709/225 |
| 2007/0074261 A1* | 3/2007 | Bowen et al. | 725/129 |
| 2007/0198718 A1* | 8/2007 | Savoor et al. | 709/226 |
| 2008/0084979 A1* | 4/2008 | Barreiro | 379/142.04 |
| 2008/0095325 A1* | 4/2008 | Chilton et al. | 379/1.01 |

* cited by examiner

*Primary Examiner* — Chi H. Pham
*Assistant Examiner* — Shick Hom
(74) *Attorney, Agent, or Firm* — Jackson Walker L.L.P.

(57) ABSTRACT

A system for collecting data from a communications network includes customer premises equipment ("CPE") for monitoring and storing response data. A CPE data collection module uses a Web-based service to collect information from the CPE and process the information to determine line quality and any errors that may exist on either the WAN side or the LAN side of the communications network, and further determine the root cause based on built-in business rules for trouble shooting customer service. The CPE conducts per-tone diagnostics on the WAN side of the communications network and obtains WAN side data. The CPE obtains response data from devices on the LAN side. Both WAN side data and LAN data may be transmitted substantially in real-time or stored and transmitted periodically to the CPE data collection module upon requests originated from the CPE data collection module.

15 Claims, 1 Drawing Sheet

NETWORK MONITORING BY CUSTOMER PREMISES EQUIPMENT

BACKGROUND

1. Field of the Disclosure

This disclosure relates to monitoring networks by customer premises equipment.

2. Description of the Related Art

Data can be transmitted in a communications network over telephone lines using Digital Subscriber Line ("DSL") technology. On the provider side of the communications network, multiple DSL lines can be connected to a Digital Subscriber Line Access Multiplexer (DSLAM). The DSLAM and related equipment may be configured to collect data from the provider side of the communications network, but the data is limited.

DESCRIPTION OF THE EMBODIMENT(S)

Figure 1:
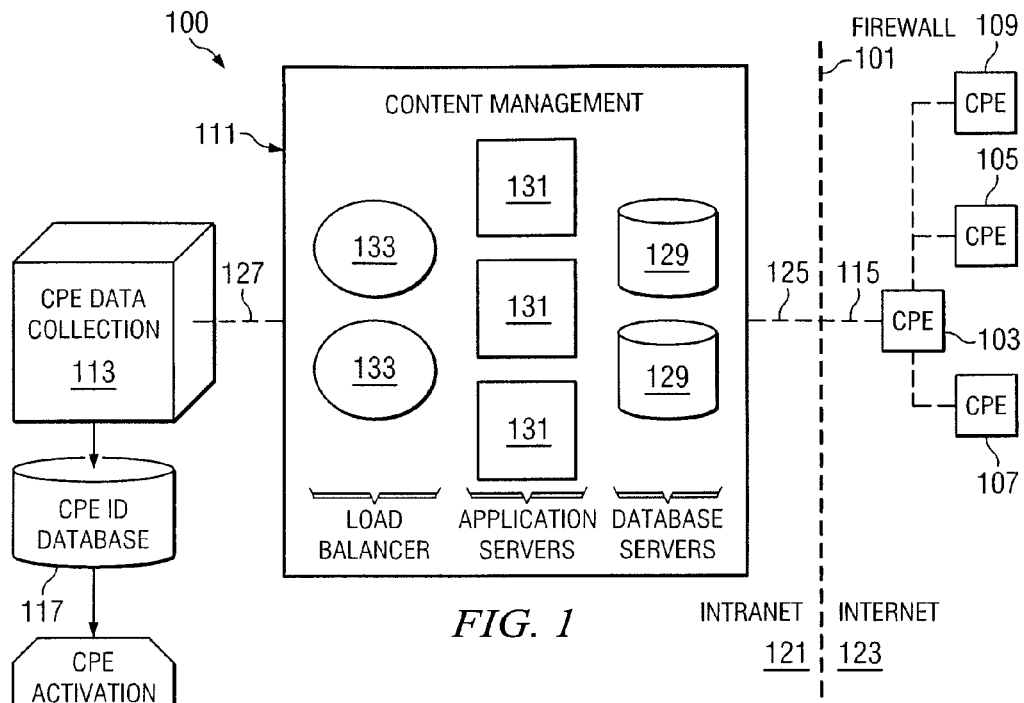
FIG. 1 depicts an embodied system for data collection in a network by customer premises equipment ("CPE")

DSL is a technology for high-speed data transmission over conventional telephone lines. DSL has several forms, including asymmetric DSL ("ADSL"), high bit rate DSL ("HDSL"), and symmetric DSL ("SDSL"), as examples. At the user end of a communications network that employs DSL technology, a CPE or collection of CPE sends and receives data over a DSL connection. Data sent to and from the DSL connection travels over wires or other paths referred to as a "local loop." The local loop often includes telephone company wires from the user's business or residence to the telephone company's central office, for example. This local loop may also be called the "last mile." In some cases, the local loop includes wires from a DSLAM on telephone company property to a user's business or residence.

A DSLAM intermixes voice traffic and DSL traffic (i.e., data traffic) sent toward a user's CPE onto a user's DSL line. Conversely, for signals sent from the user's CPE, the DSLAM accepts and separates the user's outgoing phone and data signals. Upon this separation of voice and data signals, telephone wires carry voice signals through a main distribution frame ("MDF") to a voice switch. Traditional voice signals pass between the voice switch and a user's line through the DSLAM, which is designed to add a higher frequency data signal while leaving voice signals undisturbed.

The DSL connection at a user's location is typically made through a DSL modem or residential gateway, each of which is an example of a CPE. The term "CPE" also includes other appliances that may be connected at the user end such as set-top boxes, answering machines, video telephones, internet protocol televisions ("IPTVs"), voice over IP ("VoIP") telephones, personal computers, and routers. CPE may be connected in a local area network ("LAN") which communicates over the DSL connection through a server, router, modem, or other similar device. In such cases, the CPE is said to reside on the "LAN side" of the communications network. In contrast, other equipment such as a DSLAM, MDF or local loop wiring resides on the wide area network ("WAN") side of the communications network. Generally, CPE such as a DSL modem or residential gateway allows communication between LAN side equipment and WAN side equipment.

A high percentage of problems in a communications network occur on the LAN side and are associated with CPE. For example, there may be problems with connections between CPE. Therefore, a robust system for troubleshooting and maintaining a communications network should include provisions for acquiring response data from CPE regarding the health of the communications network. Although a DSLAM may collect response data from the WAN side of the communications network, such data may be deficient. For example, a DSLAM is generally unable to obtain conditions regarding each physical interface such as Ethernet, HPNA (Home Phoneline Networking Alliance), and wireless protocols. Also, the DSLAM is unable to view conditions of the communications network on the WAN side of the network as viewed by the CPE. Further, troubleshooting directed from the DSLAM side typically does not supply rich per-tone base data such as downstream HLOG and signal-to-noise ratio ("SNR").

Embodiments disclosed herein collect response data from the LAN side of the communications network. For example, in some embodiments a residential gateway or DSL modem conducts per-tone diagnostics on the WAN side of the communications network. Some embodiments provide other complex data assessment such as loop length computations, bridged tap detection, and active noise level measurement. As additional aspects, in some embodiments the residential gateway or DSL modem provides historical data, real-time data, or both regarding operation of CPE on the LAN side (i.e., the user's side) of the communications network. In addition, some implementations provide graphical charts of downstream or upstream user activity and otherwise provide charts of line noise, line errors, and other similar parameters.

In one aspect, a system is disclosed for data collection in a communications network. The system includes a CPE data collection module in communication with a content management server ("CMS server"). A CPE device communicates with the CMS server and the CPE data collection module receives a plurality of CPE diagnostic parameters from the CPE device.

In another aspect, an embodied process includes enabling a first CPE to collect and store first response data. The first CPE is for facilitating communication between one or more devices on a LAN side of a network with one or more devices on a WAN side of the network. The method includes transmitting the first response data to a CPE data collection module.

As an additional aspect, some embodiments include a residential gateway operating in a communications network. The residential gateway includes an input interface coupled to a local loop. The residential gateway includes a transceiver in communication with the input interface for sending and receiving over the input interface a first plurality of signals. A first output interface is included with the residential gateway for providing an Internet connection to a first CPE. The residential gateway includes a processor for conducting diagnostic tests to obtain response data. Additionally, the residential gateway includes a memory for storing the response data.

FIG. 1 illustrates a system 100 for diagnosing a communications network. Equipment on a provider side 121 of a firewall 101 is arranged in an Intranet. Equipment on a user side 123 of the firewall 101 includes a first data path 115 for communicating with a second data path 125 on the provider side 121. As shown, a CPE 103 is in communication with CPE 105, a CPE 107, and a CPE 109 through a local area network ("LAN"). In addition, CPE 103 is in communication through an Internet connection over first data path 115 and second data path 125 with a content management server ("CMS server") 111. In some embodiments, CPE 103 is a residential gateway, a DSL modem, or a router. Each of CPE 109, CPE 105, and CPE 107 may be a set-top box, a video telephone, a VoIP telephone, a printer, a router, a switch, an answering machine, or another such device, as examples.

As an aspect of some embodiments, CPE 103 collects data for accurate loop length computing and bridge tap detection based on HLOG (per tone attenuation). DSL technologies (e.g., ADSL, ADSL2, ADSL2+, VDSL, VDSL2) use discrete multi-tone modulation (DMT), which divides the transmit spectrum into numerous narrowband frequency tones. For example, tone bandwidth can be 4.3125 kHz and the number of tones can range from 255 to 6956. Each frequency tone typically carries a different subcarrier. In some embodiments, CPE 103 uses start-up sequences to collect DSL loop channel response data (i.e., diagnostic parameters) at each frequency tone from data path 115. The loop channel response data may be stored in memory and retrieved to derive loop characteristics. In some embodiments, CPE data collection module 113 collects the response data and derives network characteristics such as HLOG, which is a logarithmic representation of the loop magnitude response in decibels (dB) for a range of frequencies. In addition, loop length can be calculated by CPE data collection module 113 using the collected response data. Calculating the loop length provides an indication of the quality of DSL service available.

As an additional aspect, some embodiments detect bridged taps using the response data. Bridged taps can adversely affect DSL connections, depending on where the tap is bridged. Generally, the farther away a bridged tap is from the user's location, the less the adverse effect the bridged tap has on DSL signals. DSL signals find an impedance discontinuity at un-terminated ends, and the DSL signals may reflect back through a cable pair. These echo signals can create distortion, so it is desirable to detect and eliminate bridged taps. In system 100 (FIG. 1), to calculate a bridged tap the CPE data collection module 113 may be programmed to detect in the response data a characteristic ripple in a wideband frequency response collected during testing. From this ripple, the length of the bridged tap can be estimated.

In addition to collecting data for measuring HLOG and detecting bridged taps, CPE 103 may be enabled to record downstream code violations, upstream code violations, downstream usage, and upstream usage. These and other parameters may be transmitted to CPE data collection module 113 in real time or alternatively, recorded with predetermined regularity such as every 15 minutes for an interval of 7 days. CPE 103 may also collect data used for supply line (i.e., data path 115) noise condition analysis based on signal-to-noise ratio ("SNR"). Such noise condition assessments may help choose the correct service profile to overcome the environment noise.

As shown in FIG. 1, CPE data collection module 113 communicates with CMS server 111 by a web service 127. CPE data collection module 113 receives a plurality of CPE diagnostic parameters (i.e., response data) from CPE 103. System 100 further includes a CPE identification (ID) database 117, which is accessible by the CPE data collection module 113 for cross-referencing the one or more CPE devices, such as CPE 103 and CPE 105, with user information. System 100 includes a CPE activation system 119 that can be used by a service provider to access, activate and deactivate CPE features within CPE 103, CPE 109, CPE 105, or CPE 107.

In some embodiments, CMS server 111 communicates with CPE 103 using a WAN management protocol, for example, TR-069. TR-069 is a CPE WAN Management Protocol (CWMP) that facilitates communication and provides CMS server 111 a common platform to manage multiple CPE through the Internet. TR-069 is intended to be device agnostic so that CMS server 111 can manage any CPE device regardless of the manufacturer of the CPE. In some embodiments, CMS server 111 uses TR-069 to periodically initiate a connection with CPE 103 which avoids the need for a persistent connection to be maintained between any CPE and the CMS server 111. In this way, several types of CPE, such as VoIP analog telephone adapters (ATA), DSL modems, and residential gateways can be managed and monitored via TR-069 and its extensions (e.g., TR-098, TR-104, TR-106, TR-110, TR-111).

As shown, CMS server 111 includes one or more load balancers 133, one or more application servers 131, and one or more database servers 129. Load balancer 133 manages connections between CPE 103 and CMS server 111, contributes to increased capacity of CMS server 111, and prevents service interruptions due to server failure or maintenance. Load balancer 133, in some embodiments, consists of a virtual server (a "vserver" or "VIP") which, in turn, consists of an IP address and port. In operation, a client running on CPE 103 may send a request to the virtual server operating in load balancer 133. The request is then directed to an application server 131 selected by load balancer 133.

Figure 2:
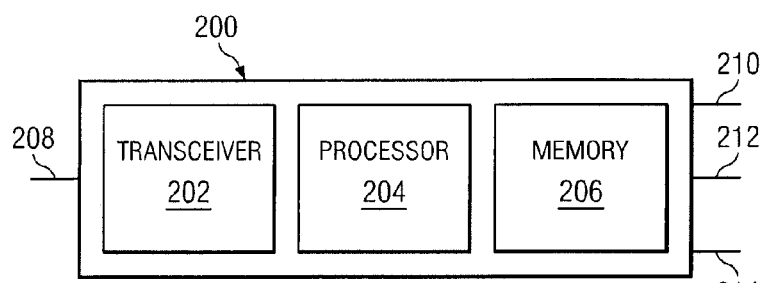
FIG. 2 illustrates aspects of an embodied residential gateway for collecting response data regarding a network.

FIG. 2 illustrates a residential gateway 200 for operating in a communications network including system 100 (FIG. 1). Residential gateway 200 includes an input interface 208, which is coupled to a local loop (not shown) of the communications network. Transceiver 202 communicates with input interface 208 for sending and receiving a plurality of signals over input interface 208. The plurality of signals includes user-generated data, for example data generated by a user requesting a Web page. The plurality of signals may also include, in accordance with disclosed embodiments, response data generated during per-tone diagnostics. As shown, residential gateway 200 includes a first output interface 210 for providing an Internet connection to a first CPE. For example, if CPE 105 (FIG. 1) is a personal computer, first output interface 210 provides CPE 105 (FIG. 1) with an Internet connection for obtaining streaming videos from Web sites. As another example, if CPE 107 (FIG. 1) is a VoIP telephone, first output interface 210 facilitates CPE 107 (FIG. 1) making telephone calls over the Internet. As shown, residential gateway 200 further includes a processor 204 for conducting diagnostic tests to obtain response data. Response data includes connection quality data obtained from the local loop, or alternatively data obtained from LAN side equipment such as other CPE, as examples. In addition, response data may include a ratio of the number of packets that successfully reach their destination versus the number of packets that are dropped. For a communications network employing one or more VoIP telephones, residential gateway 200 may track the number of incoming calls, the number of outgoing calls, and the number of calls successfully completed versus the number of calls dropped. Residential gateway 200 further includes a memory for storing the collected response data. As shown, residential gateway 200 optionally includes a second output interface 212 for providing VoIP service to a CPE. In this way, residential gateway 200 provides an Internet connection to one CPE (for example, CPE 105 (FIG. 1)) and a telephone connection to another device, such as a VoIP telephone. As shown, residential gateway 200 optionally includes a third output interface 214 for providing a data connection to one or more CPE.

In some embodiments, residential gateway 200 is enabled to conduct per-tone diagnostics on a local loop. The data from the per-tone diagnostic testing is stored in memory 206, and may be sent substantially in real time to a CPE data collection module for processing. For example, processor 204 is enabled to initiate sending the response data or diagnostic data from per-tone diagnostic tests to CPE data collection module 113 (FIG. 1). Sending the response data may occur at predetermined intervals, in response to an operator input, or in response to detected events. In some embodiments, residential gateway 200 is enabled for communicating the response data through CMS server 111 (FIG. 1) using the TR-069 protocol.

Figure 3:
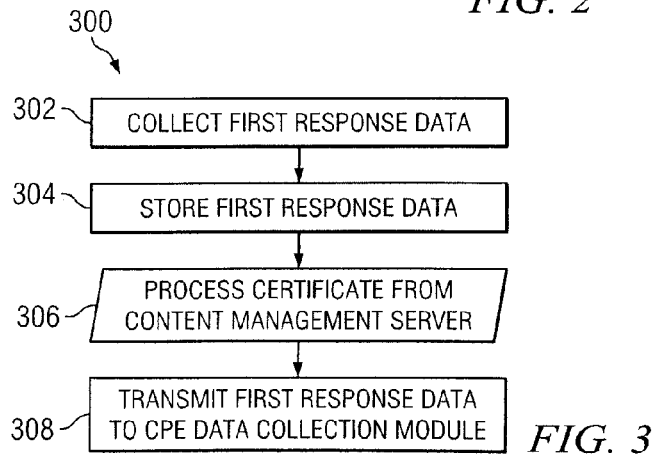
FIG. 3 illustrates features of a process for collecting response data.

Referring to FIG. 3, aspects of a process 300 include an operation 302 for collecting first response data. In some embodiments, a first CPE is enabled to conduct per-tone diagnostics on the LAN side of a network. For example, in an embodiment, CPE 103 (FIG. 1) is enabled using residential gateway 200 (FIG. 2) to collect first response data by conducting per-tone diagnostics on data path 115 (FIG. 1). Referring to FIG. 3, process 300 further includes operation 304 for storing the first response data. For the collection operation 302 and the storage operation 304 residential gateway 200 (FIG. 2) may employ memory 206 (FIG. 2) for storing the response data. As shown in FIG. 3, the process 300 further includes an optional operation 306 for the CPE processing a digital certificate from a content management server. For example, in an embodiment CPE 103 (FIG. 1) processes the digital certificate sent from content management server 111 (FIG. 1) to determine whether the CPE 103 should transmit the first response data to the content management server 111. Based on the certificate, if the identity of the content management server is approved by the first CPE, the first CPE transmits the data. Process 300 further includes an operation 308 for transmitting the response data to a CPE data collection module. In an embodiment transceiver 202 (FIG. 2) transmits the response data over input interface 208 (FIG. 2) to CPE data collection module 113 (FIG. 1). In some embodiments, a first CPE (e.g. CPE 103, FIG. 1) collects and stores second response data, with the second response data containing information on functionality of a second CPE (e.g. CPE 109, FIG. 1). For example, CPE 103 collects and stores the information regarding the number of successful calls and the number of dropped calls processed by CPE 109, which is a VoIP telephone in some embodiments. Thus a CPE such as a DSL modem, residential gateway, or some similar device is employed to collect, store, and transmit response data regarding another CPE. Transmission of the data may be substantially in real-time at the request of an operator of a CPE data collection module. Alternatively, transmission of the data may occur periodically after automatic, scheduled collection of the data by the CPE.

The above disclosed subject matter is to be considered illustrative, and not restrictive, and the appended claims are intended to cover all such modifications, enhancements, and other embodiments which fall within the true spirit and scope of the present disclosure. For example, the use of the term "residential gateway" herein is not meant to be restrictive regarding disclosed embodiments. The term is meant to include other hardware devices such as routers that may be used in business or residential settings. Such devices may provide port translation (NAT), and may be positioned between a modem and an internal network. A residential gateway as disclosed herein may also include a hardware device with an integrated DSL modem. Such hardware devices may be wireless, wired or a combination of wireless and wired and may also combine the functions of an IP router, hub, multi-port Ethernet switch, DHCP server, WiMAX access point, and WiFi access point, as examples. Thus, to the maximum extent allowed, the scope of the present disclosure is to be determined by the broadest permissible interpretation of the following claims and their equivalents, and shall not be restricted or limited by the foregoing detailed description.

What is claimed is:

1. A system for data collection in a communications network, the system comprising:
   a CMS server in communication with a CPE data collection module and a CPE device, the CMS server configured to:
   receive a plurality of CPE diagnostic parameters from the CPE device; and
   transmitting, via a first data path through a firewall, the plurality of CPE diagnostic parameters to the CMS server, wherein the CPE diagnostic parameters are selected from the group consisting of per-tone attenuation parameters indicative of per-tone attenuation of a connection between the CMS server and the CPE device, downstream code violation parameters, upstream code violation parameters, and noise condition parameters indicative of a signal to noise ratio of the connection between the CMS server and the CPE device.

2. The system of claim 1, wherein the CPE device is integrated with a DSL modem.

3. The system of claim 1, wherein the CMS server communicates with the CPE data collection module through a web-based service.

4. The system of claim 1, wherein the CPE diagnostic parameters are collected and recorded substantially in real-time.

5. The system of claim 1, wherein the CPE device is connected in a local area network that includes a plurality of CPE.

6. The system of claim 1, further comprising:
   a CPE identification database accessible by the CPE data collection module for retrieving a stored user parameter associated with the CPE device.

7. The system of claim 6, wherein the CMS server provides a function selected from the group consisting of:
   a load balancer;
   an application server; and
   a database server.

8. The system of claim 7, further comprising a CPE activation system for enabling and disabling the CPE device.

9. A method of operating a first customer premise equipment (CPE) configured to facilitate communication between one or more devices on a LAN side of a network and a WAN side of the network, the method comprising:
   collecting and storing by the first CPE first response data, the first response data including WAN side per tone attenuation data;
   processing by the first CPE a digital certificate from a content management server to determine whether the first CPE should transmit the first response data; and
   transmitting by the first CPE the first response data to a CPE data collection module.

10. The method of claim 9, further comprising:
    collecting and storing by the first CPE second response data, the second response data regarding functionality of a second CPE.

11. A gateway operating comprising:
    an input interface for connecting to a LAN side of a network;

a transceiver in communication with the input interface for sending and receiving a first plurality of signals over the input interface, the first plurality of signals containing user-generated data;

a first output interface for connecting to a WAN side of the network and for providing an Internet connection to a first CPE;

a processor for conducting diagnostic tests to obtain response data, the response data indicative of a signal-to-noise (SNR) ratio of at least a portion of the WAN side of the network;

a memory for storing the response data;

a second output interface for providing telephone signals to a second CPE;

a third output interface for providing the Internet connection to a plurality of CPE, the plurality of CPE in addition to the first CPE;

wherein the response data is sent to a CPE data collections module substantially in real-time.

12. The residential gateway of claim 11, wherein the processor is enabled to conduct per-tone attenuation diagnostics on a local loop to result in per-tone diagnostic data stored in the memory.

13. The residential gateway of claim 12, wherein in response to an operator input, the processor is enabled to initiate sending the per-tone diagnostic data to a CPE data collection module.

14. The residential gateway of claim 13, wherein the residential gateway is enabled for communicating with a content management server using TR-069 protocol.

15. The system of claim 1, wherein the communications network includes a LAN side and a WAN side separated by the firewall and wherein the CMS server and the CPE data collection module reside on the WAN side and the CPE device resides on the LAN side.

* * * * *